(12) United States Patent
Gustafson et al.

(10) Patent No.: US 8,046,833 B2
(45) Date of Patent: Oct. 25, 2011

(54) INTRUSION EVENT CORRELATION WITH NETWORK DISCOVERY INFORMATION

(75) Inventors: Eric Gustafson, Ellicott City, MD (US); Brian P. Rittermann, Ellicott City, MD (US)

(73) Assignee: Sourcefire, Inc., Columbia, MD (US)

( * ) Notice: Subject to any disclaimer, the term of this patent is extended or adjusted under 35 U.S.C. 154(b) by 1014 days.

(21) Appl. No.: 11/272,035

(22) Filed: Nov. 14, 2005

(65) Prior Publication Data
US 2008/0244741 A1 Oct. 2, 2008

(51) Int. Cl.
*G06F 12/14* (2006.01)
(52) U.S. Cl. ........................................................ 726/23
(58) Field of Classification Search ...................... 726/23
See application file for complete search history.

(56) References Cited

U.S. PATENT DOCUMENTS

| | | | |
|---|---|---|---|
| 4,550,436 A | 10/1985 | Freeman | |
| 4,570,157 A | 2/1986 | Kodaira | |
| 4,857,912 A | 8/1989 | Everett et al. | |
| 4,912,748 A | 3/1990 | Horii et al. | |
| 4,985,863 A | 1/1991 | Fujisawa et al. | |
| 5,193,192 A | 3/1993 | Seberger | |
| 5,222,081 A | 6/1993 | Lewis et al. | |
| 5,404,488 A | 4/1995 | Kerrigan et al. | |
| 5,430,842 A | 7/1995 | Thompson et al. | |
| 5,459,841 A | 10/1995 | Flora-Holmquist et al. | |
| 5,495,409 A | 2/1996 | Kanno | |
| 5,497,463 A | 3/1996 | Stein et al. | |
| 5,604,910 A | 2/1997 | Kojima et al. | |
| 5,666,293 A | 9/1997 | Metz et al. | |
| 5,796,942 A | 8/1998 | Esbensen | |
| 5,870,554 A | 2/1999 | Grossman et al. | |
| 5,901,307 A | 5/1999 | Potter et al. | .................. 712/240 |
| 5,917,821 A | 6/1999 | Gobuyan et al. | |
| 5,919,257 A | 7/1999 | Trostle | |
| 5,963,942 A | 10/1999 | Igata | |
| 5,987,473 A | 11/1999 | Jorgensen | |
| 5,995,963 A | 11/1999 | Nanba et al. | |
| 5,999,937 A | 12/1999 | Ellard | |
| 6,002,427 A | 12/1999 | Kipust | |
| 6,141,686 A | 10/2000 | Jackowski et al. | |

(Continued)

FOREIGN PATENT DOCUMENTS
GB 2 432 933 A 6/2007
(Continued)

OTHER PUBLICATIONS

Office Action issued by the U.S. Patent Office on Oct. 6, 2008 in connection with related U.S. Appl. No. 10/843,374.

(Continued)

*Primary Examiner* — Nasser Moazzami
*Assistant Examiner* — Michael S McNally
(74) *Attorney, Agent, or Firm* — Posz Law Group, PLC

(57) ABSTRACT

A policy component includes policy configuration information. The policy configuration information contains one or more rules. Each rule and group of rules can be associated with a set of response actions. As the nodes on the monitored networks change or intrusive actions are introduced on the networks, network change events or intrusion events are generated. The policy component correlates network change events and/or intrusions events with network map information. The network map contains information on the network topology, services and network devices, amongst other things. When certain criteria is satisfied based on the correlation, a policy violation event may be issued by the system resulting in alerts or remediations.

26 Claims, 7 Drawing Sheets

U.S. PATENT DOCUMENTS

| | | | |
|---|---|---|---|
| 6,199,181 B1 | 3/2001 | Rechef et al. | |
| 6,219,786 B1 | 4/2001 | Cunningham et al. | |
| 6,320,848 B1 | 11/2001 | Edwards et al. | |
| 6,321,338 B1 | 11/2001 | Porras et al. | |
| 6,324,656 B1 | 11/2001 | Gleichauf et al. | |
| 6,334,121 B1 | 12/2001 | Primeaux et al. | |
| 6,343,362 B1 | 1/2002 | Ptacek et al. | |
| 6,393,474 B1 | 5/2002 | Eichert et al. | |
| 6,415,321 B1* | 7/2002 | Gleichauf et al. | 709/224 |
| 6,477,648 B1 | 11/2002 | Schell et al. | |
| 6,487,666 B1 | 11/2002 | Shanklin et al. | |
| 6,499,107 B1 | 12/2002 | Gleichauf et al. | |
| 6,539,381 B1 | 3/2003 | Prasad et al. | |
| 6,546,493 B1* | 4/2003 | Magdych et al. | 726/25 |
| 6,587,876 B1 | 7/2003 | Mahon et al. | |
| 6,590,885 B1 | 7/2003 | Jorgensen | |
| 6,678,734 B1 | 1/2004 | Haatainen et al. | |
| 6,678,824 B1 | 1/2004 | Cannon et al. | |
| 6,684,332 B1 | 1/2004 | Douglas | |
| 6,711,127 B1* | 3/2004 | Gorman et al. | 370/230 |
| 6,754,826 B1 | 6/2004 | Challener et al. | |
| 6,766,320 B1 | 7/2004 | Wang et al. | |
| 6,772,196 B1 | 8/2004 | Kirsch et al. | |
| 6,789,202 B1 | 9/2004 | Ko et al. | |
| 6,816,973 B1* | 11/2004 | Gleichauf et al. | 726/13 |
| 6,851,061 B1 | 2/2005 | Holland et al. | |
| 6,957,348 B1 | 10/2005 | Flowers et al. | |
| 6,983,323 B2 | 1/2006 | Cantrell et al. | |
| 6,993,706 B2 | 1/2006 | Cook | |
| 6,999,998 B2 | 2/2006 | Russell | |
| 7,032,114 B1 | 4/2006 | Moran | 713/187 |
| 7,054,930 B1 | 5/2006 | Cheriton | |
| 7,058,821 B1 | 6/2006 | Parekh et al. | |
| 7,065,657 B1 | 6/2006 | Moran | |
| 7,073,198 B1 | 7/2006 | Flowers et al. | 726/25 |
| 7,076,803 B2 | 7/2006 | Bruton et al. | |
| 7,096,503 B1 | 8/2006 | Magdych et al. | |
| 7,113,789 B1 | 9/2006 | Boehmke | |
| 7,133,916 B2 | 11/2006 | Schunemann | |
| 7,134,141 B2 | 11/2006 | Crosbie et al. | |
| 7,152,105 B2 | 12/2006 | McClure et al. | 709/224 |
| 7,174,566 B2 | 2/2007 | Yadav | |
| 7,181,769 B1 | 2/2007 | Keanini et al. | |
| 7,257,630 B2 | 8/2007 | Cole et al. | 709/224 |
| 7,305,708 B2 | 12/2007 | Norton et al. | |
| 7,310,688 B1 | 12/2007 | Chin | 709/252 |
| 7,313,695 B2 | 12/2007 | Norton et al. | |
| 7,315,801 B1 | 1/2008 | Dowd et al. | |
| 7,317,693 B1 | 1/2008 | Roesch et al. | |
| 7,346,922 B2 | 3/2008 | Miliefsky | |
| 7,350,077 B2 | 3/2008 | Meier et al. | |
| 7,363,656 B2 | 4/2008 | Weber et al. | |
| 7,467,202 B2 | 12/2008 | Savchuk | |
| 7,596,807 B2 | 9/2009 | Ptacek et al. | |
| 7,644,275 B2 | 1/2010 | Mowers et al. | |
| 2001/0027485 A1 | 10/2001 | Ogishi et al. | |
| 2001/0034847 A1 | 10/2001 | Gaul, Jr. | |
| 2002/0035639 A1 | 3/2002 | Xu | |
| 2002/0066034 A1 | 5/2002 | Schlossberg | |
| 2002/0083344 A1 | 6/2002 | Vairavan | |
| 2002/0087716 A1 | 7/2002 | Mustafa | |
| 2002/0112185 A1 | 8/2002 | Hodges | |
| 2002/0123995 A1 | 9/2002 | Shibuya | |
| 2002/0165707 A1 | 11/2002 | Call | |
| 2003/0009699 A1 | 1/2003 | Gupta et al. | |
| 2003/0014662 A1 | 1/2003 | Gupta et al. | |
| 2003/0046388 A1 | 3/2003 | Milliken | |
| 2003/0065817 A1 | 4/2003 | Benchetrit et al. | |
| 2003/0083847 A1 | 5/2003 | Schertz et al. | |
| 2003/0093517 A1 | 5/2003 | Tarquini | |
| 2003/0101353 A1 | 5/2003 | Tarquini et al. | 713/200 |
| 2003/0126472 A1 | 7/2003 | Banzhof | |
| 2003/0140250 A1 | 7/2003 | Taninaka et al. | |
| 2003/0195874 A1 | 10/2003 | Akaboshi | |
| 2003/0212910 A1* | 11/2003 | Rowland et al. | 713/201 |
| 2003/0217283 A1* | 11/2003 | Hrastar et al. | 713/200 |
| 2003/0229726 A1 | 12/2003 | Daseke et al. | |
| 2004/0010684 A1 | 1/2004 | Douglas | |
| 2004/0015728 A1* | 1/2004 | Cole et al. | 713/201 |
| 2004/0034773 A1 | 2/2004 | Balabine et al. | |
| 2004/0064726 A1 | 4/2004 | Girouard | |
| 2004/0073800 A1* | 4/2004 | Shah et al. | 713/176 |
| 2004/0093582 A1 | 5/2004 | Segura | |
| 2004/0098618 A1* | 5/2004 | Kim et al. | 713/201 |
| 2004/0123153 A1 | 6/2004 | Wright et al. | |
| 2004/0172234 A1 | 9/2004 | Dapp et al. | |
| 2004/0179477 A1 | 9/2004 | Lincoln et al. | |
| 2004/0193943 A1 | 9/2004 | Angelino et al. | |
| 2004/0210756 A1 | 10/2004 | Mowers et al. | |
| 2004/0218532 A1 | 11/2004 | Khirman | |
| 2004/0221176 A1 | 11/2004 | Cole | |
| 2004/0250032 A1 | 12/2004 | Ji et al. | |
| 2004/0268358 A1 | 12/2004 | Darling et al. | |
| 2005/0005169 A1 | 1/2005 | Kelekar | |
| 2005/0015623 A1 | 1/2005 | Williams et al. | |
| 2005/0044422 A1 | 2/2005 | Cantrell et al. | |
| 2005/0076066 A1 | 4/2005 | Stakutis et al. | |
| 2005/0108393 A1 | 5/2005 | Banerjee et al. | |
| 2005/0113941 A1 | 5/2005 | Ii et al. | |
| 2005/0114700 A1 | 5/2005 | Barrie et al. | |
| 2005/0160095 A1 | 7/2005 | Dick et al. | |
| 2005/0172019 A1 | 8/2005 | Williamson et al. | |
| 2005/0188079 A1 | 8/2005 | Motsinger et al. | |
| 2005/0229255 A1* | 10/2005 | Gula et al. | 726/23 |
| 2005/0240604 A1 | 10/2005 | Corl Jr. et al. | |
| 2005/0251500 A1 | 11/2005 | Vahalia et al. | |
| 2005/0268331 A1 | 12/2005 | Le et al. | |
| 2005/0268332 A1 | 12/2005 | Le et al. | |
| 2005/0273673 A1 | 12/2005 | Gassoway | |
| 2005/0273857 A1 | 12/2005 | Freund | |
| 2006/0174337 A1 | 8/2006 | Bernoth | |
| 2006/0265748 A1 | 11/2006 | Potok | |
| 2006/0294588 A1 | 12/2006 | Lahann et al. | |
| 2007/0027913 A1 | 2/2007 | Jensen et al. | |
| 2007/0058631 A1* | 3/2007 | Mortier et al. | 370/392 |
| 2007/0162463 A1 | 7/2007 | Kester et al. | |
| 2007/0192863 A1 | 8/2007 | Kapoor et al. | |
| 2007/0195797 A1 | 8/2007 | Patel et al. | |
| 2007/0271371 A1 | 11/2007 | Singh Ahuja et al. | |
| 2007/0288579 A1 | 12/2007 | Schunemann | |
| 2008/0168561 A1 | 7/2008 | Durie et al. | |
| 2009/0028147 A1 | 1/2009 | Russell | |
| 2009/0041020 A1 | 2/2009 | Gibbons et al. | |

FOREIGN PATENT DOCUMENTS

| | | |
|---|---|---|
| WO | WO 01/37511 A2 | 5/2001 |
| WO | WO 2004/100011 A1 | 11/2004 |
| WO | WO 2005/064884 A1 | 7/2005 |
| WO | WO 2006/025050 A2 | 3/2006 |

OTHER PUBLICATIONS

Notice of Allowance issued by the U.S. Patent Office on Oct. 15, 2008 in connection with related U.S. Appl. No. 10/951,796.

Notice of Allowance issued by the U.S. Patent Office on Oct. 21, 2008 in connection with related U.S. Appl. No. 10/843,375.

European Office Action issued by the European Patent Office on Nov. 28, 2008 in connection with European patent application No. 07 015 003.2-2413, which corresponds to related U.S. Appl. No. 11/501,776.

Office Action issued by the U.S. Patent Office on Dec. 17, 2008 in connection with related U.S. Appl. No. 10/843,398.

Office Action issued by the U.S. Patent Office on Dec. 23, 2008 in connection with related U.S. Appl. No. 11/272,034.

Office Action issued on Feb. 5, 2008 in connection with the related U.S. Appl. No. 10/843,375.

Spitzner, Lance; Passive Fingerprinting, May 3, 2003; Focus on Intrusion Detection; pp. 1-4; obtained from http://www.ctillhq.com/pdfdb/000183/data.pdf.

Lyon, Gordon; Remote OS detection via TCP/IP Stack Fingerprinting, Jun. 30, 2002; pp. 1-12; obtained from: http://web.archive.org/web/20021017063625/www.insecure.org/nmap/nmap-fingerprinting-article.html.

Office Action issued by the U.S. Patent Office on Jan. 16, 2009 in connection with related U.S. Appl. No. 10/843,353.

Office Action issued by the U.S. Patent Office on Jan. 21, 2009 in connection with related U.S. Appl. No. 11/493,934.
Notice of Allowance issued by the U.S. Patent Office on Jan. 21, 2009 in connection with related U.S. Appl. No. 10/898,220.
Office Action issued by the U.S. Patent Office on Feb. 4, 2009 in connection with related U.S. Appl. No. 10/843,373.
Office Action issued by the U.S. Patent Office on Feb. 9, 2009 in connection with related U.S. Appl. No. 10/843,459.
International Preliminary Report on Patentability and Written Opinion of the International Searching Authority mailed on Mar. 3, 2009 in connection with PCT application No. PCT/US05/025584, which corresponds to related U.S. Appl. No. 10/898,220.
International Preliminary Report on Patentability and Written Opinion of the International Searching Authority mailed on Mar. 17, 2009 in connection with corresponding PCT application No. PCT/US06/43820.
International Search Report and Written Opinion of the International Searching Authority issued on Jul. 7, 2008 in connection with corresponding PCT application No. PCT/US06/43820.
Spitzner, Lance; Passive Fingerprinting, May 3, 2003; Focus on Intrusion Detection; pp. 1-4; obtained from http://www.ctillhq.com/pdfdb/000183/data.pdf.
U.S. Appl. No. 10/843,353, filed May 2004, Roesch et al., System and Method for Determining Characteristics of a Network and Analyzing Vulnerabilities.
U.S. Appl. No. 10/843,373, filed May 2004, Roesch et al., Systems and Methods for Identifying the Services of a Network.
U.S. Appl. No. 10/843,374, filed May 2004, Roesch et al., System and Methods for Determining Characteristics of a Network Based on Flow Analysis.
U.S. Appl. No. 10/843,375, filed May 2004, Roesch et al., Systems and Methods for Determining Characteristics of a Network and Assessing Confidence.
U.S. Appl. No. 10/843,398, filed May 2004, Roesch et al., Systems and Methods for Determining Characteristics of a Network.
U.S. Appl. No. 10/843,459, filed May 2004, Roesch et al., Systems and Methods for Determining Characteristics of a Network and Enforcing Policy.
U.S. Appl. No. 10/898,220, filed Jul. 2004, Norton et al., Methods and Systems for Multi-Pattern Searching.
U.S. Appl. No. 10/951,796, filed Sep. 2004, Roelker et al., Intrusion Detection Strategies for Hypertext Transport Protocol.
U.S. Appl. No. 11/272,033, filed Nov. 2005, Dempster et al., Systems and Methods for Identifying the Client Applications of a Network.
U.S. Appl. No. 11/272,034, filed Nov. 2005, Vogel III et al., Systems and Methods for Modifying Network Map Attributes.
U.S. Appl. No. 11/493,934, filed Jul. 2006, Roesch et al., Device, System and Method for Analysis of Fragments in a Fragment Train.
U.S. Appl. No. 11/501,776, filed Aug. 2006, Roesch et al., Device, System and Method for Analysis of Segments in a Transmission Control Protocol (TCP) Session.
U.S. Appl. No. 11/711,876, filed Feb. 2007, Sturges et al., Device, System and Method for Timestamp Analysis of Segments in a Transmission Control Protocol (TCP) Session.
U.S. Appl. No. 11/785,609, filed Apr. 2007, Norton et al., Methods and Systems for Multi-Pattern Searching.
U.S. Appl. No. 11/905,980, filed Oct. 2007, Roesch, Device, System and Method for Use of Micro-Policies in Intrusion Detection/Prevention.
U.S. Appl. No. 12/010,900, filed Jan. 2008, Norton et al., Methods and Systems for Multi-Pattern Searching.
U.S. Appl. No. 12/149,196, filed Apr. 2008, Rittermann, Real-Time User Awareness for a Computer Network.
U.S. Appl. No. 12/230,338, filed Aug. 2008, Sturges et al., Speed and Memory Optimization of Intrusion Detection System (IDS) and Intrusion Prevention System (IPS) Rule Processing.
Aho et al., "Efficient String Matching: An Aid to Bibliographic Search," *Communications from the ACM* (Jun. 1975), vol. 18, No. 6, pp. 333-340.
Tarjan, et al., "Storing a Sparse Table," Communications of the ACM (Nov. 1979), vol. 2, No. 11, pp. 606-620.
T. Ptacek, et al., "Insertion, Evasion, and Denial of Service: Eluding Network Intrusion Detection", Jan. 1998, pp. 1-63.

N. Chase, "Active Server Pages 3.0 from Scratch" (Dec. 1999), Searching for products section, 13 pp.
B. Krishnamurthy, "Web Protocols and Practice," (May 1, 2001), pp. 518-520.
U. Shankar and V. Paxson, *Active Mapping: Resisting NIDS Evasion Without Altering Traffic*, Proc. IEEE Symposium on Security and Privacy. May 2003, pp. 1-18.
D. Roelker, "HTTP IDS Evasions Revisited" (Aug. 1, 2003) [online] (retrieved on Nov. 9, 2006). Retrieved from the Internet <URL: http://docs.idsresearch.org/http_ids_evasions.pdf>.
Norton et al., "Multi-Patten Search Engine Aho-Corasick State Machine" (Mar. 17, 2004), Version 2.0, 36 pp.
M. Norton, "Optimizing Pattern Matching for Intrusion Detection" (Jul. 4, 2004) [online] (retrieved on Nov. 9, 2006). Retrieved from the Internet <URL: http://docs.idsresearch.org/OptimizingPatternMatchingForIDS.pdf>.
Norton et al., "Sourcefire Optimizing Pattern Matching for Intrusion Detection" (Sep. 2004), 14 pp.
J. Novak, "Target-Based Fragmentation Reassembly" (Apr. 2005), Revision 2.0, pp. 1-32.
S.Siddharth, "Evading NIDS, revisited" (Dec. 12, 2005).
"Snort™ Users Manual 2.6.0," *The Snort Project* (May 23, 2006), pp. 1-126.
"toupper()—convert lowercase character to uppercase," http://www.mkssoftware.com, printed on Sep. 20, 2008 from http://web.archive.org, archive date Jun. 30, 2006, 2 pp.
J. Novak et al., "Target-Based TCP Stream Reassembly" (Aug. 3, 2007), Revision 1.0, pp. 1-23, obtained from: http://www.snort/org/docs/stream5-modelAUg032007.pdf.
"TaoSecurity—Dedicated to FreeBSD, network security monitoring, incident response, and network forensics," (Oct. 1, 2007), obtained from: http://taosecurity.blogspot.com/2005/02/shmoocon-concludes-shmoocon-finished.html.
Office Action issued by the U.S. Patent Office on Jul. 16, 2007 in connection with related U.S. Appl. No. 10/898,220.
Office Action issued by the U.S. Patent Office on Sep. 6, 2007 in connection with related U.S. Appl. No. 10/843,374.
Notice of Allowance issued by the U.S. Patent Office on Sep. 6, 2007 in connection with related U.S. Appl. No. 10/843,376.
Office Action issued by the U.S. Patent Office on Sep. 26, 2007 in connection with related U.S. Appl. No. 10/843,353.
Office Action issued by the U.S. Patent Office on Oct. 4, 2007 in connection with related U.S. Appl. No. 10/951,796.
Notice of Allowance issued by the U.S. Patent Office on Oct. 5, 2007 in connection with related U.S. Appl. No. 10/793,887.
International Search Report and Written Opinion of the International Searching Authority issued on Oct. 9, 2007 in connection with PCT application No. PCT/US06/43800, which corresponds to U.S. Appl. No. 11/272,034.
Office Action issued by the U.S. Patent Office on Nov. 21, 2007 in connection with related U.S. Appl. No. 10/843,398.
European Search Report issued by the European Patent Office on Nov. 22, 2007 in connection with European patent application No. 07014575.0-1244, which corresponds to related U.S. Appl. No. 11/493,934.
International Search Report and Written Opinion of the International Searching Authority issued on Dec. 5, 2007 in connection with PCT application No. PCT/US05/25583, which corresponds to U.S. Appl. No. 10/951,796.
European Search Report issued by the European Patent Office on Dec. 27, 2007 in connection with European patent application No. 07015003.2-2413, which corresponds to related U.S. Appl. No. 11/501,776.
Office Action issued by the U.S. Patent Office on Jan. 10, 2008 in connection with related U.S. Appl. No. 10/843,373.
Office Action issued by the U.S. Patent Office on Feb. 21, 2008 in connection with related U.S. Appl. No. 11/272,033.
Office Action issued by the U.S. Patent Office on Mar. 12, 2008 in connection with related U.S. Appl. No. 10/843,459.
Office Action issued by the U.S. Patent Office on Mar. 20, 2008 in connection with related U.S. Appl. No. 10/843,374.
Final Office Action issued by the U.S. Patent Office on May 9, 2008 in connection with related U.S. Appl. No. 10/843,353.

International Preliminary Report on Patentability mailed on May 22, 2008 in connection with PCT application No. PCT/US06/43800, which corresponds to U.S. Appl. No. 11/272,034.
Final Office Action issued by the U.S. Patent Office on Jun. 4, 2008 in connection with related U.S. Appl. No. 10/843,398.
International Search Report and Written Opinion of the International Searching Authority issued on Jun. 19, 2008 in connection with PCT application No. PCT/US05/25584, which corresponds to U.S. Appl. No. 10/898,220.
Final Office Action issued by the U.S. Patent Office on Jun. 26, 2008 in connection with related U.S. Appl. No. 10/898,220.
International Search Report and Written Opinion of the International Searching Authority issued on Jun. 30, 2008 in connection with PCT application No. PCT/US07/21351, which corresponds to U.S. Appl. No. 11/905,980.
International Search Report and Written Opinion of the International Searching Authority issued on Jul. 2, 2008 in connection with PCT application No. PCT/US08/02454, which corresponds to U.S. Appl. No. 11/711,876.
Office Action issued by the U.S. Patent Office on Jul. 11, 2008 in connection with related U.S. Appl. No. 11/272,034.
Final Office Action issued by the U.S. Patent Office on Jul. 17, 2008 in connection with related U.S. Appl. No. 10/843,459.
Final Office Action issued by the U.S. Patent Office on Aug. 6, 2008 in connection with related U.S. Appl. No. 10/843,375.
Notice of Allowance issued by the U.S. Patent Office on Aug. 18, 2008 in connection with related U.S. Appl. No. 11/272,033.
International Search Report and Written Opinion of the International Searching Authority issued on Aug. 18, 2008 in connection with PCT application No. PCT/US08/05466, which corresponds to U.S. Appl. No. 12/149,196.
Final Office Action issued by the U.S. Patent Office on Aug. 19, 2008 in connection with related U.S. Appl. No. 10/843,373.
Final Office Action issued by the U.S. Patent Office on Aug. 20, 2008 in connection with related U.S. Appl. No. 10/843,353.
Office Action issued by the U.S. Patent Office on Jul. 6, 2009 in connection with related U.S. Appl. No. 10/843,459.
Office Action issued by the U.S. Patent Office on Jul. 7, 2009 in connection with related U.S. Appl. No. 10/843,398.
Office Action issued by the U.S. Patent Office on Jul. 28, 2009 in connection with related U.S. Appl. No. 10/843,353.
Office Action issued by the U.S. Patent Office on Jul. 30, 2009 in connection with related U.S. Appl. No. 11/493,934.
Office Action issued by the U.S. Patent Office on Aug. 20, 2009 in connection with related U.S. Appl. No. 10/843,374.
International Preliminary Report on Patentability mailed on Sep. 11, 2009 in connection with PCT application No. PCT/US08/002454, which corresponds to U.S. Appl. No. 11/711,876.
Advisory Action issued by the U.S. Patent Office on Sep. 29, 2009 in connection with related U.S. Appl. No. 10/843,459.
R. Deraison, et al., "Passive Vulnerability Scanning. Introduction to NeVO," *Tenable Network Security*, May 30, 2004, pp. 1-13.
Full Band and Matrix Algorithms (Jun. 9, 2004), http://web.archive.org/web20040109154658/http://www.netlib.org/utk/Isi/pcwLSI/text/node150.html.
R. Deraison, et al., "Nessus Network Auditing," Sungress Publishing, Jul. 20, 2004, pp. 1-13.
International Preliminary Report on Patentability mailed on Apr. 7, 2009 in connection with PCT application No. PCT/US07/021351, which corresponds to U.S. Appl. No. 11/905,980.
Office Action issued by the U.S. Patent Office on Apr. 28, 2009 in connection with related U.S. Appl. No. 11/501,776.
Final Office Action issued by the U.S. Patent Office on May 13, 2009 in connection with related U.S. Appl. No. 10/843,374.
Office Action issued by the U.S. Patent Office on May 14, 2009 in connection with related U.S. Appl. No. 11/272,034.
International Search Report and Written Opinion of the International Searching Authority mailed on May 27, 2009 in connection with PCT application No. PCT/US09/02210, which corresponds to U.S. Appl. No. 12/230,338.
Notice of Allowance issued by the U.S. Patent Office on Jun. 11, 2009 in connection with related U.S. Appl. No. 10/843,373.

Office Action issued by the U.S. Patent Office on Jun. 23, 2009 in connection with related U.S. Appl. No. 11/785,609.
European Search Report issued by the European Patent Office on Oct. 12, 2009 in connection with European patent application No. 05773501.1-2201, which corresponds to related U.S. Appl. Nos. 10/898,220, 11/785,609 and 12/010,900.
Final Office Action issued by the U.S. Patent Office on Oct. 29, 2009 in connection with related U.S. Appl. No. 11/501,776.
International Preliminary Report on Patentability mailed on Nov. 12, 2009 in connection with PCT application No. PCT/US08/005466, which corresponds to U.S. Appl. No. 12/149,196.
Advisory Action issued by the U.S. Patent Office on Dec. 2, 2009 in connection with related U.S. Appl. No. 10/843,398.
Notice of Allowance issued by the U.S. Patent Office on Dec. 8, 2009 in connection with related U.S. Appl. No. 11/501,776.
Final Office Action issued by the U.S. Patent Office on Dec. 8, 2009 in connection with related U.S. Appl. No. 11/272,034.
Office Action issued by the U.S. Patent Office on Dec. 17, 2009 in connection with related U.S. Appl. No. 11/493,934.
R. Gula, "Passive Vulnerability Detection. *Techniques to passively find network security vulnerabilities*," Sep. 9, 1999 (5 pp.).
R.P. Lippmann et al., "Passive Operating System Identification from TCP/IP Packet Headers," *Proceedings Workshop on Data Mining for Computer Security (DMSEC)*, Nov. 2003 (10 pp.).
N. Brownlee, et al., "Methodology for Passive Analysis of a University Internet Link," *PAM2001 Passive and Active Measurement Workshop*, Apr. 2001 (7 pp.).
Notice of Allowance issued by the U.S. Patent Office on Jan. 7, 2010 in connection with related U.S. Appl. No. 10/843,353.
Notice of Allowance issued by the U.S. Patent Office on Jan. 8, 2010 in connection with related U.S. Appl. No. 10/843,373.
Office Action issued by the European Patent Office on Jan. 15, 2010 in connection with European patent application No. 05773501.1-2201, which corresponds to related U.S. Appl. Nos. 10/898,220, 11/785,609 and 12/010,900.
Office Action issued by the U.S. Patent Office on Mar. 22, 2010 in connection with related U.S. Appl. No. 11/493,934.
Notice of Allowance issued by the U.S. Patent Office on Mar. 5, 2010 in connection with related U.S. Appl. No. 11/785,609.
Final Office Action issued by the U.S. Patent Office on Mar. 17, 2010 in connection with related U.S. Appl. No. 10/843,374.
Notice of Allowance issued by the U.S. Patent Office on Feb. 5, 2010 in connection with related U.S. Appl. No. 11/272,034.
International Search Report and Written Opinion of the International Searching Authority issued on Mar. 16, 2010 in connection with PCT application No. PCT/US09/59965, which corresponds to U.S. Appl. No. 12/575,612.
V. Jacobson, et al., Request for Comments: 1323, "TCP Extensions for High Performance," May 1992 (35 pages).
D. Joseph, et al., "A Policy-aware Switching Layer for Data Centers," *SIGCOMM*, Aug. 17-22, 2008, pp. 51-62.
Office Action issued by the U.S. Patent Office on Apr. 7, 2010 in connection with related U.S. Appl. No. 11/711,876.
Office Action issued by the U.S. Patent Office on Apr. 15, 2010 in connection with related U.S. Appl. No. 12/010,900.
Office Action issued by the U.S. Patent Office on Apr. 21, 2010 in connection with related U.S. Appl. No. 10/843,459.
Notice of Allowance issued by the U.S. Patent Office on May 24, 2010 in connection with related U.S. Appl. No. 10/843,398.
U.S. Appl. No. 12/813,859, filed Jun. 2010, Polley et al.
R. Hiyoshi, "Practical Guide to Intrusion Detection System: Snort & Tripwire," Japan, Apr. 25, 2004, pp. 57-230 (concise English explanation of relevance attached).
"Enhanced Operating System Identification with Nessus," Tenable Network Security (2007), obtained from: http://blog.tenablesecurity.com/2009/02/enhanced_operat.html, posted by R. Gula on Feb. 16, 2009 (3 pp. total).
Advisory Action issued by the U.S. Patent Office on Aug. 3, 2010 in connection with related U.S. Appl. No. 10/843,374.
Final Office Action issued by the U.S. Patent Office on Sep. 8, 2010 in connection with related U.S. Appl. No. 10/843,459.
Final Office Action issued by the U.S. Patent Office on Sep. 17, 2010 in connection with related U.S. Appl. No. 11/711,876.

Office Action mailed Sep. 7, 2010 from the Japan Patent Office for Japanese patent application No. 2007-523639 in connection with related U.S. Appl. No. 10/951,796, now U.S. patent No. 7,496,962 (English translation enclosed).

Final Office Action issued by the U.S. Patent Office on Sep. 30, 2010 in connection with related U.S. Appl. No. 11/493,934.

U.S. Appl. No. 12/820,227, filed Jun. 2010, Vogel, III et al.

Notice of Allowance issued by the U.S. Patent Office on Oct. 5, 2010 in connection with related U.S. Appl. No. 10/843,374.

International Preliminary Report on Patentability mailed on Oct. 19, 2010 in connection with PCT application No. PCT/US2009/02210, which corresponds to U.S. Appl. No. 12/230,338.

Final Office Action issued by the U.S. Patent Office on Nov. 4, 2010 in connection with related U.S. Appl. No. 10/843,459.

Office Action issued by the U.S. Patent Office on Nov. 19, 2010 in connection with related U.S. Appl. No. 10/843,459.

Final Office Action issued by the U.S. Patent Office on Nov. 24, 2010 in connection with related U.S. Appl. No. 12/010,900.

Office Action issued by the U.S. Patent Office on Dec. 22, 2010 in connection with related U.S. Appl. No. 11/905,980.

U.S. Appl. No. 12/969,682, filed Dec. 2010, Roesch et al.

Press Release, "FaceTime Protects Enterprises from Information Leaks over Collaborative Suites like Microsoft OCS and IBM Sametime", issued by FaceTime Communications, Belmont, California, Jul. 14, 2008, retrieved from www.facetime.com/pr/pr080714.aspx , Dec. 1, 2009.

Office Action mailed Mar. 1, 2011 from the Japan Patent Office for Japanese patent application No. 2007-523640 in connection with related U.S. Appl. No. 10/898,220, now U.S. patent No. 7,539,681, U.S. Appl. No. 11/785,609, now U.S. patent No. 7,756,885, and U.S. Appl. No. 12/010,900 (English translation enclosed).

Office Action issued by the U.S. Patent Office on Apr. 6, 2011 in connection with related U.S. Appl. No. 11/711,876.

Office Action issued by the U.S. Patent Office on Apr. 13, 2011 in connection with related U.S. Appl. No. 12/230,338.

Office Action issued by the U.S. Patent Office on May 12, 2011 in connection with related U.S. Appl. No. 12/149,196.

U.S. Appl. No. 13/046,127, filed Mar. 11, 2011, Roesch.

U.S. Appl. No. 13/086,819, filed Apr. 14, 2011, Olney et al.

Notice of Allowance issued by the U.S. Patent Office on Apr. 6, 2011 in connection with related U.S. Appl. No. 12/010,900.

PCT International Preliminary Report on Patentability mailed on Apr. 21, 2011 by the International Bureau of WIPO in connection with PCT patent application No. PCT/US2009/059965, which corresponds to U.S. Appl. No. 12/575,612.

"Snort™ Users Manual 2.2.0RC1," *The Snort Project*, Jun. 28, 2004, Retrieved from the Internet: URL:http://cvs.snort.org/viewcvs.cgi/*checkout*/snort/doc/snort_manual.pdf?rev=1.25&content-type=application/pdf [retrieved on Nov. 18, 2010] (XP002610157).

V. Yegneswaran, et al., "Internet Sieve: An Architecture for Generating Resilient Signatures," May 2004, Retrieved from the Internet: URL:http://www.cc.gatech.edu/~giffin/papers/tr1507/tr1507.pdf [retrieved on Nov. 18, 2010] (XP002610154).

D. Roekler, "HTTP IDS Evasions Revisited," Jan. 8, 2003, Retrieved from the Internet: URL:http://docs.idsresearch.org/http_ids_evasions.pdf [Nov. 18, 2010] (XP002610155).

M. Norton, et al., "The New Snort," *Computer Security Journal*, CSI Security Institute, XIX, No. 3 (Jan. 1, 2003), pp. 37-47, ISSN: 0277-0865 (XP008039475).

European Search Report issued by the European Patent Office on Dec. 6, 2010 in connection with European patent application No. 05773540.9-2413, which corresponds to related U.S. Patent No. 7,496,962.

Notice of Allowance issued by the U.S. Patent Office on Jan. 24, 2011 in connection with related U.S. Appl. No. 10/843,459.

Notice of Allowance issued by the U.S. Patent Office on Feb. 24, 2011 in connection with related U.S. Appl. No. 11/493,934.

Office Action issued by the U.S. Patent Office on May 31, 2011 in connection with related U.S. Appl. No. 12/688,400.

Notice of Allowance issued by the U.S. Patent Office on Jul. 22, 2011 in connection with related U.S. Appl. No. 11/711,876.

Extended European Search Report issued by the European Patent Office on Jul. 19, 2011 in connection with European patent application No. 06837333.1-2413, which corresponds to related U.S. Patent No. 7,733,803.

International Search Report and Written Opinion of the International Searching Authority issued on Jul. 28, 2011 in connection with PCT application No. PCT/US2011/032489, which corresponds to U.S. Appl. No. 13/086,819.

Matthew Olney et al.: "What would you do with a pointer and a size? A New Detection Framework", Apr. 22, 2010, XP55002567, http://labs.snort.org/nrt/sfvrt-nrt.pdf (retrieved on Jul. 13, 2011) the whole document.

\* cited by examiner

Host Representative Data Structure

IP address
List of MAC addresses with Time to Live
List of Operating Systems
List of Network Protocols
List of Transport Protocols
List of TCP Service Data Structures
List of UDP Service Data Structures
VLAN tag
Last seen time

Figure 3

INTRUSION EVENT CORRELATION WITH NETWORK DISCOVERY INFORMATION

FIELD OF THE INVENTION

Embodiments of the present invention relate to systems and methods for determining the characteristics of a computer network. More particularly, embodiments of the present invention relate to systems and methods for automatically and passively determining a host configuration of a computer network.

BACKGROUND

Computers and computer networks connecting such computers are vital components of modern society. Unfortunately, such computer networks are susceptible to attacks from internal and external hostile sources. Intrusion detection systems (IDSs) are used to prevent such attacks. Conventional IDSs operate by analyzing network traffic in terms of the traffic itself. They do not, however, consider the end points of that traffic. End points refer to the originators and recipients of message traffic. Such end points include, for example, clients and the servers. Analysis of end points can provide contextual information about the network such as host addresses and services. By not considering these end points, a vital piece of contextual information about the network is missed. Consequently, a substantial need exists for technologies that provide information about the end points of computer network traffic.

IDSs are less effective than they could be because they do not have contextual information about the computer network they are monitoring. For example, without contextual information, IDSs are susceptible to computer network attacks. Not only does the lack of contextual information make the IDS more susceptible to attack, but it also makes the IDS less efficient. One such inefficiency is that, without contextual information, the IDS may not be able to discern whether or not an attack will cause harm. Attacks can be directed to a particular service running on a target host. Without information about the services running on the target host, an IDS could mistakenly detect an attack even if that host is not running the targeted service. That is, the IDS would cause an alarm even though the attack would be harmless. Such an event is called a false positive. Large numbers of false positives can make it more difficult and expensive to locate genuine attacks that can harm a host on the network.

Some conventional techniques for providing contextual information to IDSs are known. One such technique is for a human to audit each host manually and gather all desired contextual information. This manual method has a number of disadvantages including that it is time consuming, prone to error, and makes maintenance more difficult. One reason for these drawbacks is that networks are dynamic in nature. Host computers in computer networks are added, removed, and reconfigured. If these changes are not meticulously documented, each computer on the network must be revisited periodically to insure that the contextual information is up to date.

Another conventional technique for providing contextual information to an IDS is an automatic discovery system. Conventional automatic discovery systems are active scanning systems that actively probe end hosts on a computer network and perform stimulus response tests on them to find and record vulnerabilities that exist on end hosts. Though not manual, active scanning systems also suffer from several problems. One problem is that active scanning can be destructive to the network. In testing for vulnerabilities, they can cause both routers and servers to malfunction or stop functioning. Another problem is that they may not provide information useful to an IDS because in many instances a one-to-one mapping does not exist between the information an active scanner provides and the information an IDS can use. Another problem is that active scanners only provide a snapshot of the network at the time when the scan is performed. This snapshot is problematic because a host may run a vulnerable service transiently. In such a case, the active scanning may be performed at a time when the vulnerable service is not running. As a result, the active scan would not cause an alarm despite the transient nature of the vulnerability.

While it is advantageous to automatically and passively determine a host configuration, there may be occasions when a passive map does not incorporate information that would be useful. In view of the foregoing, it can be appreciated that a substantial need exists for systems and methods that can advantageously minimize false positives in intrusion detection system by using known network characteristics, such as host and service information about targeted network devices.

SUMMARY OF THE INVENTION

Embodiments of the present invention minimize false positives, for example, by allowing a policy component to correlate events, such as IDS events, with stored network characteristics in a network map. In this manner, false positives can be reduced in the policy component.

One embodiment of the invention includes a method for automatically and passively determining the characteristics of a network including using policy configuration information in a policy component wherein the policy configuration information comprises one or more rules. An event is identified on the network and associated with the event is a network address, such as an IP or MAC address. Next, the event is evaluated based on one or more of the rules in the policy component. As part of this process, the policy component accesses the network map to determine if the event information matches one or more criteria as part of a correlation process, and generates a policy violation event based on the determination that the event matches the one or more criteria. For example, the intrusion event information may be correlated with the network map information to answer queries associated with one or more rules in the policy component.

Another embodiment of the invention includes a system for automatically and passively determining the characteristics of a network, including a network map storage device containing network device addresses, service and network topology information, a policy component which receives an intrusion event and enforces one or more network configuration rules and wherein the policy component accesses information in the network map storage device through a link provided by a device address associated with the intrusion event to determine if information associated with the intrusion event matches network map information as part of evaluating one or more rules. Once the evaluation of the event is complete, a policy violation event may be generated if it is determined that the event is unauthorized, for example. Upon initiation of the policy violation event, remediations or alerts may be effectuated by the system. Device addresses may be any type of address for a communications or computer device including IP address or MAC address. Intrusion events may be identified based on receiving, decoding and analyzing one or more packets on the network.

BRIEF DESCRIPTION OF THE DRAWINGS

FIG. 3 illustrates an exemplary data structure used to store network device information or host information.

DETAILED DESCRIPTION OF THE INVENTION

Embodiments of systems and methods for processing network events based on one or more policies are described in this detailed description of the invention. In this detailed description, for purposes of explanation, numerous specific details are set forth to provide a thorough understanding of embodiments of the present invention. One skilled in the art can appreciate, however, that embodiments of the present invention may be practiced without these specific details. In other instances, structures and devices are shown in block diagram form. Furthermore, one skilled in the art can readily appreciate that the specific sequences in which methods are presented and performed are illustrative and it is contemplated that the sequences can be varied and still remain within the spirit and scope of embodiments of the present invention.

Figure 1:
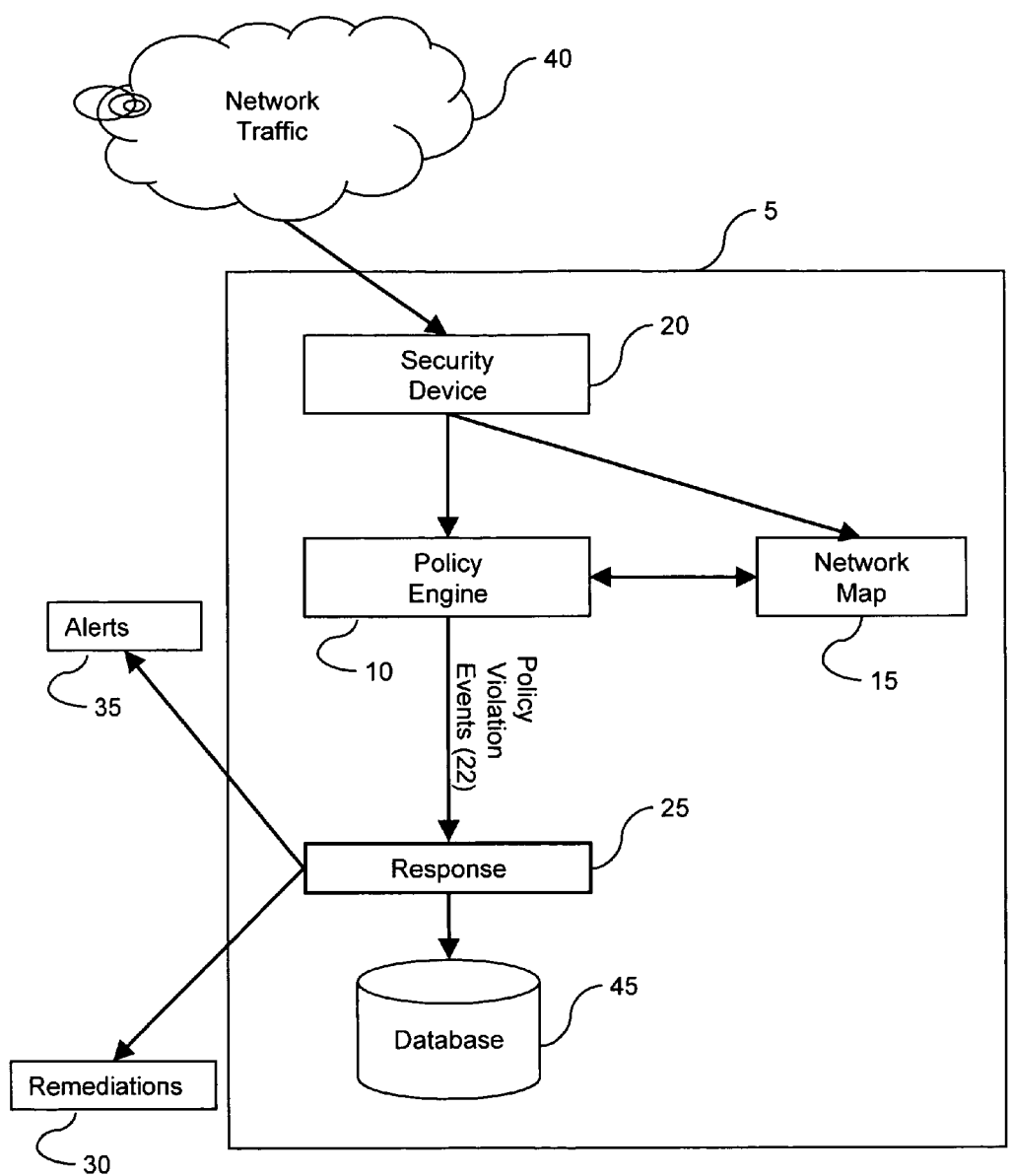
FIG. 1 illustrates an exemplary embodiment for correlating intrusion event information with network discovery information.

FIG. 1 is a schematic diagram showing an exemplary system (5) for correlating intrusion event information with network discovery information in accordance with an embodiment of the present invention. One or more security devices (20) perform attack identification and generate events. One or more security devices (20) may include intrusion detection systems (IDSs), network intrusion detection systems (NIDs), network management systems (NMSs), network sensors, host intrusion detection systems (HIDs), routers, firewalls, and system loggers. The embodiment in FIG. 1 can reduce false positives for intrusion detection systems by correlating known pre-existing host and service information about targeted network devices with the event information.

In one embodiment of this system, a single computer may include a policy component (10), a network map (15), security devices (20) and the response component (25). In other embodiments, more than one computer may house each component separately or include combinations of the above components. For example, the policy component (10) could communicate with the network map (15) which is stored on another computer through any transmission media. Single components may even be distributed across more than one device. For example, the policy component (10) may be distributed across more than one computer. The policy component (10) and network maps (15) may be stored in volatile or nonvolatile storage devices including RAM, ROM, EPROM, EEPROM, FLASHROM, or removable storage. The network shown in FIG. 1 may represent one or more networks including the Internet, Intranet, LAN, online information networks, wireless network, private or public networks (e.g, PSTN), voice and/or data networks, or cable and dBS.

As explained in more detail below, a network configuration and usage policy for the network is defined for the network and can be applied in a policy engine (10). The user configures a policy. The policy consists of a list of rules and groups of rules. Each rule and group of rules can be associated with a set of response actions. Each rule can be activated to become part of the active policy. As the nodes on the monitored networks change, events are generated to reflect the changes. If a new service is detected on a host, for example, an event is generated that contains the new service information. The events and the data contained within the events are evaluated based on the currently active policy. The events and the data contained within the events are correlated with information in the network map (15) to help reduce false positives. If the event or the data within the event triggers the rule, an event (22) is generated that initiates one or more configured responses.

With reference to FIG. 1, the network map (15) can be configured to maintain a current snapshot of the network map. The network map (15) can include information on hosts, network topology, services and vulnerabilities, for example, as explained in more detail below.

The policy engine (10) maps new events against the network map (15) to determine if there have been any policy violation events, as explained below. If there has been a policy violation, one or more remediations (30) can be performed or alerts (35) issued, as shown in FIG. 1.

Detecting Events

The events generated by one or more security devices (20) (e.g., IDSs) are collected and forwarded to the policy component (10). In another embodiment of this method, the events are collected and first stored in a database and then forwarded to the policy component (10).

Intrusion events can be determined from the one or more security devices (20) according to many different methodologies. Embodiments of the present invention can be applied to passively determined network maps or characteristic databases. These systems are passive because they examine packets moving across a network; they do not perform active scans. They are automatic because they require little or no human intervention. Such passive systems operate by performing functions including: (1) identifying network devices on a network, (2) identifying operating systems and services running on network devices, (3) recording, in real-time, changes occurring on the network, and (4) gathering this information in a format that can be used by a network reporting mechanism. Exemplary network reporting mechanisms include IDSs and network management systems (NMSs).

As shown in FIG. 1, the security devices (20) passively collect traffic (40) traveling over the network, decode data and then compare the data to established operating system and service fingerprints. They also collect flow data from network sessions that involve at least one monitored host.

Referring again to the security devices (20) shown in FIG. 1, network reporting mechanisms can examine packets moving across a network (40) in real-time for characteristic information about the network. One such type of characteristic information is information related to a network device, or host, on the network. One skilled in the art can appreciate that a network device is any device with a network connection. Network devices can include but are not limited to hosts, servers, gateways, bridges, computers, printers, switches, game machines, wireless devices, cell phones, networked televisions, PDAs, and routers.

Network Map

Referring to FIG. 1, the network map (15) is a database containing information on host, services, network topology and vulnerabilities. In some embodiments, the database is keyed to the IP addresses of the hosts or other network devices. In this manner, queries to the network map may be identified using the IP addresses or other types of addresses. The network map provides a profile of each host, bridge or router, service, and vulnerability for each RNA sensor on the network. The network map can be used to view host profiles for specific hosts. Host profiles contain detailed information about hosts, running services, and vulnerabilities for specific hosts. Discovered hosts and services can be mapped into the network map representation of the network.

The network map allows one to view the network topology in terms of the hosts that reside on the network, the bridges on the network (which may include hubs, routers, or switches), the services running on the network, operating systems, and/ or the vulnerabilities on the network. The user has the capability to view any of the above via a conventional user interface. The network map may be split into the following components: the hosts map (which displays network devices such as computers, printers, amongst other things); the bridges map (which displays bridges, switches, or routers detected on the network); the services map (which displays services detected on the network); and the vulnerabilities map (which displays vulnerabilities detected on the network).

The information in the network map may come from one or more sensors. When there is more than one sensor, the data can be correlated into a composite network map. If multiple sensors generate events from the same host or service, the information is combined from each sensor into a composite representation of that host or service according to predetermined protocols.

The network map also includes host profiles for specific hosts. Host profiles contain information about hosts, running services and vulnerabilities for specific hosts. One exemplary host profile may contain one or more of the following: host name, distance in network hops from the sensor that detected the host, operating system, host type, criticality level for the host (either automatic of user specified), link to events that involve the host, link to intrusion events where the host is either the source IP or destination IP, protocols used by the host, services running on the host, and vulnerabilities to which the host may be susceptible. The host profiles may be viewed by the user via the user interface.

The bridges portion of the network map contains information on the network bridges and routers that connect one segment of the network with another. The bridges portion may also by viewed by a user through the user interface.

The services portion of the network map provides a view of the services running on the network, the vendor and version of each service, and the hosts running each service. The user may access the network map via a user interface to view the services and list of hosts that run each service.

In response to network traffic, the identity of the network device is recorded. The identity is stored as a data structure in a file or database, for example. If a packet identifies a network device that has previously been recorded, the current information and the previous information are compared and any changes are recorded. If no changes have been found, no new information is recorded. In either case, the next packet is read.

Figure 2:
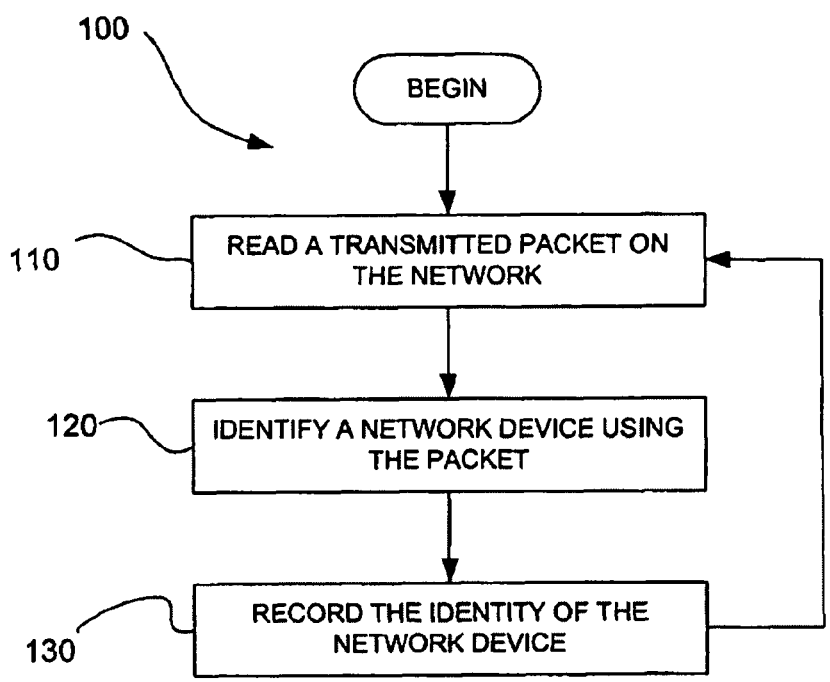
FIG. 2 illustrates an exemplary method for automatically and passively determining the characteristics of a network.

FIG. 2 is a flowchart showing an exemplary method 100 for automatically and passively determining the characteristics of a network.

In step 110 of method 100, a packet transmitted on a network is read. In step 120, a network device is identified using the packet. A network device includes but is not limited to a computer, a printer, server, cell phone, wireless device, and a router. One skilled in the art can appreciate that a network device can also be referred to as a host. In step 130, the identity of the network device is recorded. The identity is stored as a data structure in a file or database, for example. If a packet identifies a network device that has previously been recorded, the current information and the previous information are compared and any changes are recorded. If no changes have been found, no new information is recorded. In either case, method 100 returns to step 110 to read the next packet.

Further, methods for identifying a network devices' operating system, a router, services running on a network device, transmission control protocol flow on a network or subnets, amongst other things, can be determined according to any of the methods set forth in U.S. patent application Ser. No. 10/843,459, filed May 12, 2004, titled "Systems and Methods for Determining Characteristics of a Network and Enforcing Policy" which is herein incorporated by reference in its entirety. Further, methods for determining the distance between two subnets, for creating an inferred subnet on a network, and assigning vulnerability to a network device are also shown in U.S. patent application Ser. No. 10/843,459.

FIG. 3 is an exemplary data structure used to store network device information, or host information. This data structure is the host representative data structure. As non-limiting examples, the host information can include the initiator Internet protocol (IP) address, a list of media access control (MAC) addresses with a time-to-live (TTL) parameter for each MAC address, a list of operating systems, a list of network protocols, a list of transport protocols, a list of transmission control protocol (TCP) service data structures, a list of user datagram protocol (UDP) service data structures, a virtual local area network (VLAN) tag, and a last seen time. The IP address, MAC address and TTL parameter of at least one network device on the network are typically included in each packet transmitted on the network. As a result, these pieces of host information are obtained by directly parsing the network and transport protocol fields of each packet.

Policy Engine

Referring again to FIG. 1, the policy engine (10) comprises one or more policies. The policy consists of a list of rules and groups of rules. Each rule and group of rules can be associated with a set of response actions. Each rule can be activated to become part of the active policy. As the nodes on the monitored networks change, events are generated to reflect the changes. If a new service is detected on a host, an event is generated that contains the new service information. The events and the data contained within the events are evaluated based on the currently active policy. If the event or the data within the event causes the rule to fail, an event (22) is generated that triggers the configured responses.

In another embodiment, information passively discovered on a network is used to enforce a network configuration and usage policy. As part of this process, the policy component accesses the network map to determine if event information matches pre-defined ranges or values. An action is performed if a usage policy is violated. Exemplary actions can include alerting the user and denying network access based on the type of information discovered or when that information was discovered.

One exemplary usage policy can prevent unauthorized use of an operating system. An action is triggered if a discovered operating system does not match the allowable operating system for the given IP address. For example, a user specifies that only Windows 2000™ and Windows XP™ may be used on the network. If a host with any other operating system detected, an alert would be generated and the offending host would be blocked at the firewall. As part of this process, the policy component accesses the network map to determine if the operating system or network device characteristics match pre-defined ranges or values.

Another exemplary usage policy is the prevention of unauthorized service usage. An action is triggered if a prohibited service is detected. For example, the user specifies that service A is not permitted on subnet X. If service A is detected on subnet X, an alert is generated. Again, as part of this process, the policy component accesses the network map to correlate the event with the network map to determine if information relating to the service event matches pre-defined ranges or values. For example, the network map may be queried to determine if a particular IP address is permitted to have certain services or applications. In another example, the network map may suggest that for subnet Z, Linux is the only permitted operating system. Additionally, the only permitted services are secure shell (SSH) and secure sockets layer (SSL). An exception is made to allow host X to additionally run HTTP. Also, host Y is allowed to run Windows™ 2003 Server with no service restrictions. Any violations of this policy generates an policy violation event (PVE).

Another exemplary usage policy is the qualification of events. The criticality of an alert is adjusted based on information gathered from multiple sources. For example, if an attack that only affects IIS is detected and the host is a Windows™ system running IIS, a critical alert is generated. If an attack that only affects IIS is detected and the host is a Linux system, which cannot run IIS, an informational alert is generated.

Another exemplary usage policy is defining a threshold for a single event. An action is triggered upon detecting multiple events of the same type within a given time period. For example, if ten failed login attempts to a single service are detected within a thirty second time period, an alert is generated to indicate a brute force login attempt. In another example, if fifteen failed login attempts followed by a successful login to a single service are detected within a forty-five second time period, an alert is generated to indicate a successful brute force login and the client system is blocked at the firewall.

Another exemplary usage policy is detecting IDS event sequences. An action is triggered upon detecting multiple events in a given sequence within a given time period. For example, the sequence of events E, F, and G destined for a single host is indicative of a successful compromise of a host. Individually, none of the events is considered critical and are ignored. However, when occurring sequentially within a 60 second time period they represent a critical event and generate a critical alert.

In another example, a buffer overflow attack is detected against a host and within 5 minutes a new telnet server is detected on the host. A critical alert is generated and the firewall blocks traffic to and from the host.

Another exemplary usage policy is maintaining temporal constraints. An action is triggered upon detecting sessions established during prohibited times. For example, normal virtual private network (VPN) connections occur between the hours of 7:00 a.m. and 9:00 p.m. EST. A connection initiated at 2:00 a.m. generates an alert. Another exemplary usage policy is maintaining statistical constraints. An action is triggered upon detecting deviations from normal operating parameters. For example, a web server that normally serves 30000 hits per hour is currently serving 5 hits per hour. An alert is generated.

Additional policy response actions include event logging to a local database (45), system logging a service message, performing a simple network management protocol (SNMP) trap, generating an e-mail message, controlling a network device (e.g. invoke a firewall rule or disable a network switch port), and raise or lower the priority of an IDS event. If a node changes to the Windows™ operating system and a policy is written that prohibits the Windows™ operating system is in effect with an e-mail response action configured, an e-mail message is generated containing the event data and rule ID.

Policy analysis is further described in U.S. patent application Ser. No. 10/843,398, filed May 12, 2004, titled "Systems and Methods for Determining Characteristics of a Network" which is herein incorporated by reference in its entirety.

Figure 4:
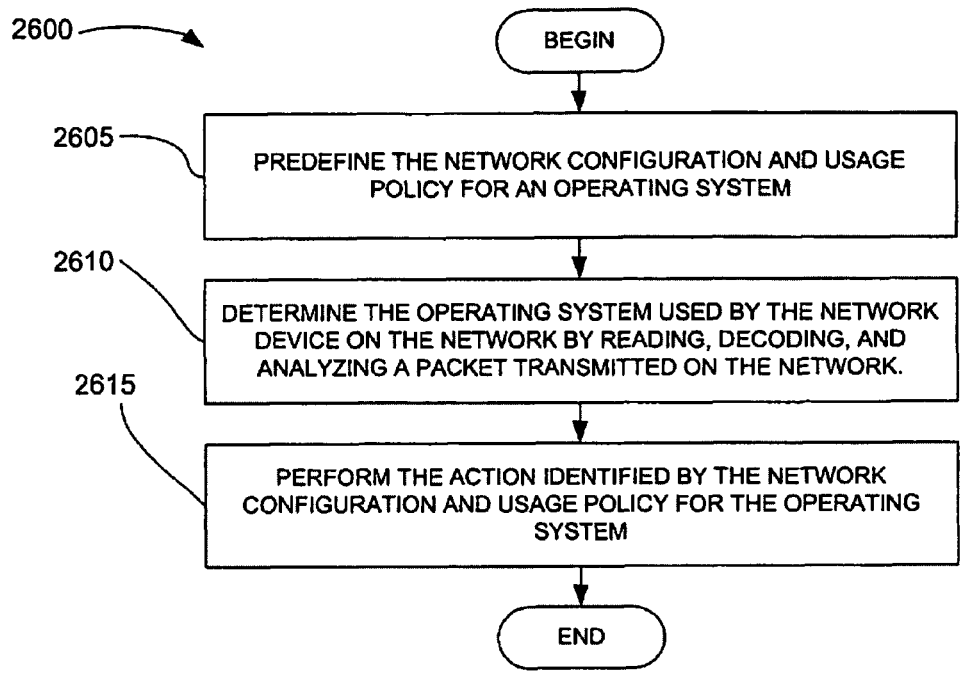
FIG. 4 illustrates an exemplary method for enforcing a network configuration and usage policy.

FIG. 4 is a flowchart showing a method 2600 for enforcing a network configuration and usage policy based on an operating system using a passive network detection system, in accordance with an embodiment of the present invention. In step 2605 of method 2600, the network configuration and usage policy for an operating system is predefined. In step 2610, the operating system used by the network device on the network is determined by reading, decoding, and analyzing a packet transmitted on the network. In step 2615, an action identified by the network configuration and usage policy for the operating system is performed.

Figure 5:
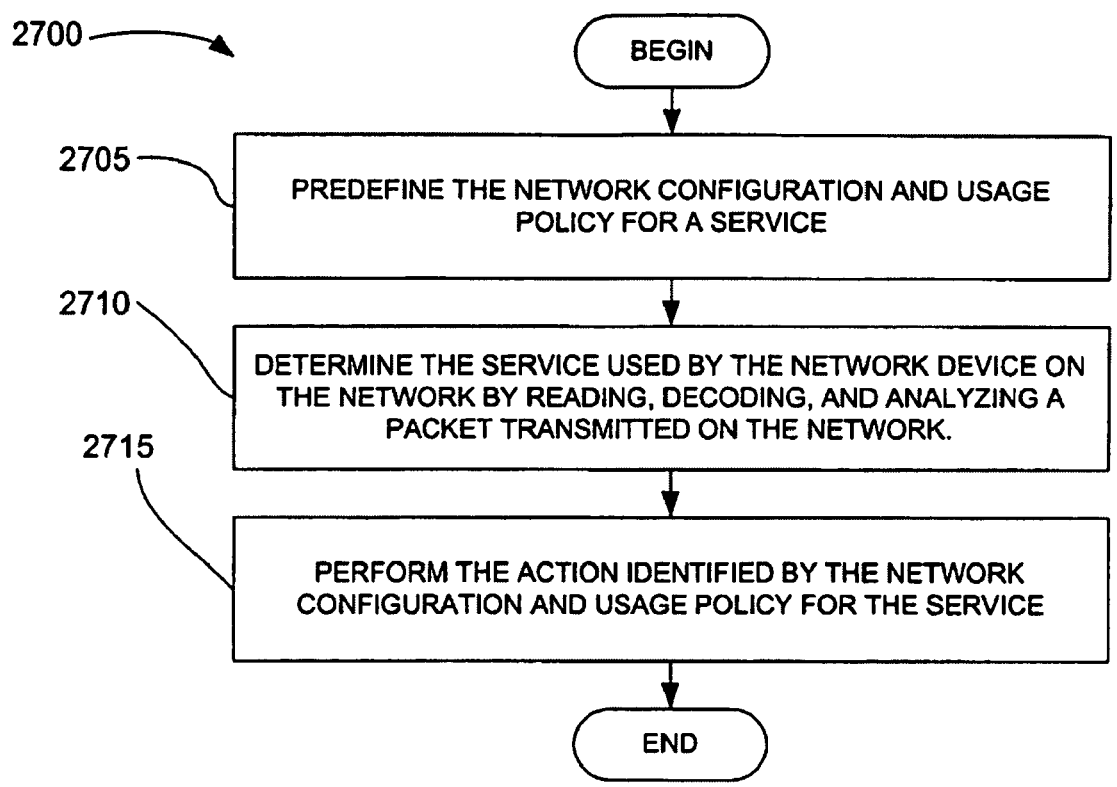
FIG. 5 illustrates an exemplary method for enforcing a network configuration and usage policy using a passive network detection system.

FIG. 5 is a flowchart showing a method 2700 for enforcing a network configuration and usage policy based on a service using a passive network detection system, in accordance with an embodiment of the present invention. In step 2705 of method 2700, the network configuration and usage policy for a service is predefined. In step 2710, the service used by the network device on the network is determined by reading, decoding, and analyzing a packet transmitted on the network. In step 2715, an action identified by the network configuration and usage policy for the service is performed.

Operation

Figure 6:
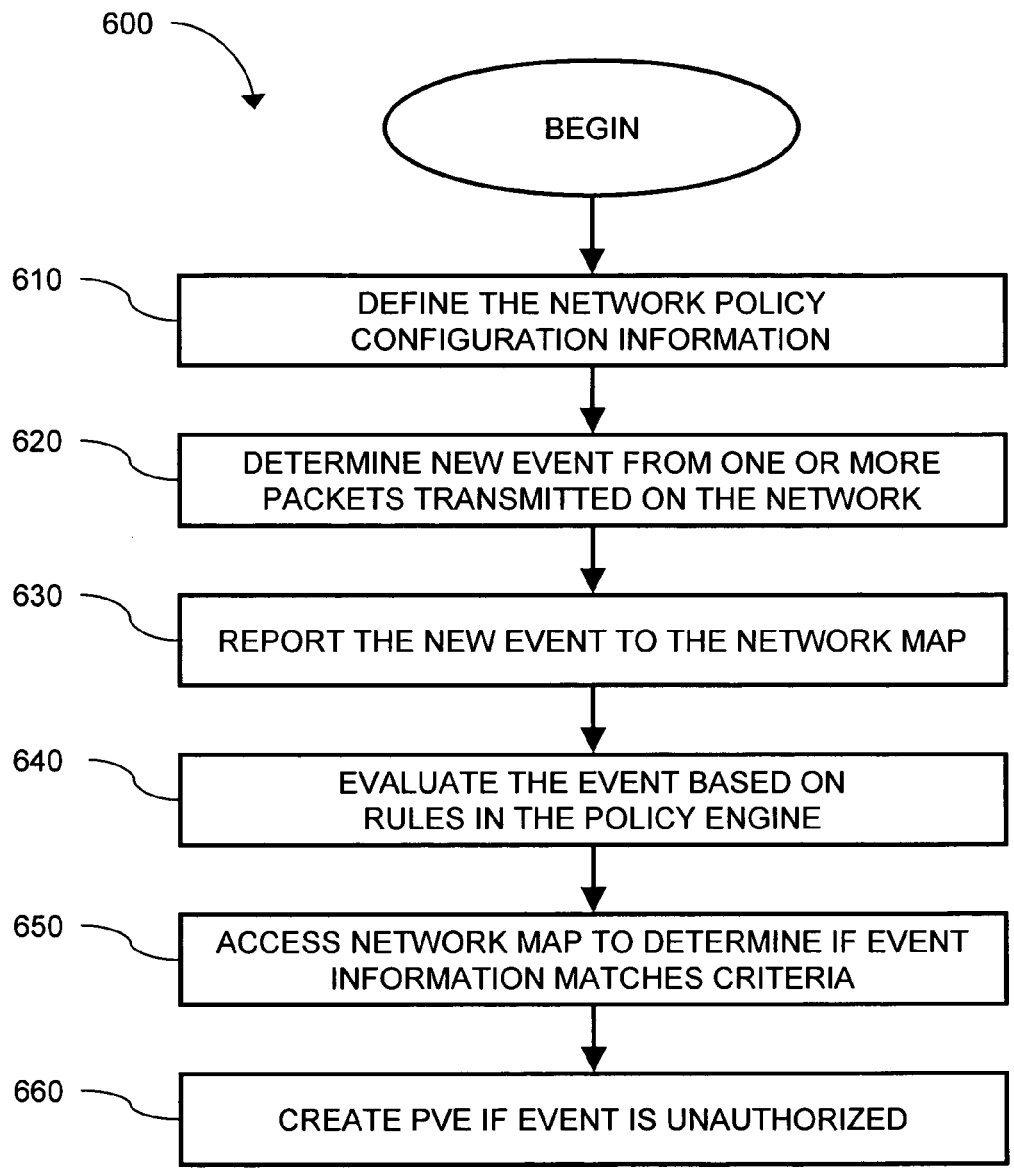
FIG. 6 illustrates an exemplary method for determining policy violation events.

FIG. 6 is a flowchart showing the steps of an exemplary method for determining policy violation events (PVEs) in accordance with an embodiment of the present invention. In step 610 of method 600, a network configuration and usage policy is defined for the network. In step 620, it is determined if a new intrusion event, such as a new service, has been added to a network device on the network by reading, decoding and analyzing a packet transmitted on the network. For example, an IDS may identify an intrusion event. In step 630, the new event that is associated with an identified IP address is reported to the network map. If the identified service is new, for example, a new entry is created in the network map. If the information associated with the event is not new but merely an update, the network map is updated with the new information. In step 640, the policy engine evaluates the event information against one or more rules in the policy engine. As part of this evaluation, in step 650, the network map is accessed using the identified IP address associated with the intrusion event to determine if event information matches certain criteria. The IP address is used to link to the host or other network device information in the network map. For example, it may be determined that an IP address operates with a Windows operating system. In step 660, the process determines whether the event, such as a new service, is authorized based on the triggering of one or more of the aforementioned rules. If the new event is not authorized, a policy violation event (PVE) is issued. Based on the PVE, a remediation or alert may be activated by the system. In one embodiment, PVEs are logged to a database (45). In this manner, PVEs can be generated for any event type and can be constrained with network map information, such as host information, that is queried based on an IP address(es) in the triggering events.

While FIG. 6 illustrates an exemplary process for determining if an unauthorized service had been introduced on a network device, the same or similar methodology can be used to determine any events including, for example, the following events: unauthorized or allowable operating system for a given IP address, qualification of events, detecting IDS event sequences, detecting a buffer overflow event, detecting sessions established during prohibited times, impermissibly controlling a network device, amongst other events.

Figure 7:
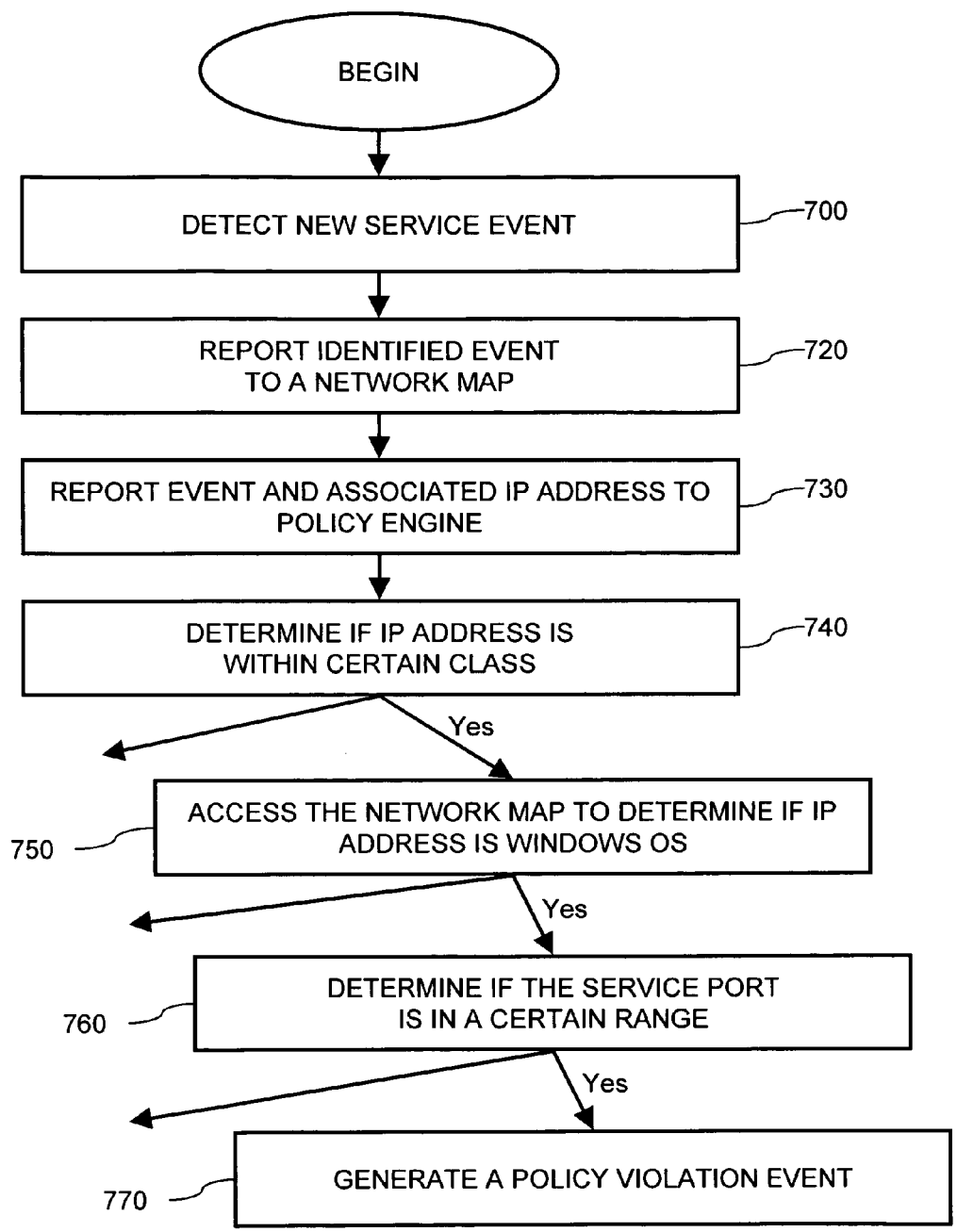
FIG. 7 illustrates an exemplary method for processing a new service event.

FIG. 7 illustrates an exemplary method for processing a new service event. This method will be described based on the following hypothetical: an unauthorized service is initiated on a network device identified with an IP address falling within 10.4.0.0 and running on the port identified as 80, 8080 or 443. In step 700, based on analyzing one or more packets on the network, a new service event is detected by an IDS. In step 720, the new detected service event is added to the records associated with the IP address (or any other identifier) of the network device. Next, the service event and the associated IP address are reported to the policy engine in step 730. The policy engine compares the event information to one or more rules. In step 740, it determines if the IP address falls within a specific category or class. The specific category may be 10.4.0/16, for example. If the address does not fall within this category, the process is completed with no violation. If, however, the IP address falls within 10.4.0/16, the policy engine communicates with the network map to determine if the IP address is associated with a Windows™ operating system in step 750. In this manner, intrusion event information is correlated with the current network characteristics in the network map. Next, in step 760, the policy engine determines whether the service event port is in a certain range or has certain values such as 80, 8080 or 443. If so, a policy violation event is issued in step 770. In this embodiment, a remediation could be issued by the remediation component or an alert could be issued by the system.

Remediations and Alerts

Remediations can include programs that embodiments run when a compliance policy is violated as indicated by the policy engine. Remediation modules may use information provided in the Policy Violation Event (PVE) that triggered the violation to perform a specific action. Embodiments of the present invention include default predefined remediation modules and user customized remediation modules that perform specific tasks when policy violations are triggered. Some embodiments can include flexible application programming interfaces (APIs) that allow users to create and upload custom remediation modules to respond to policy violation events.

For example, if a network is running a Linux-based firewall, a remediation module could dynamically update IP tables on the Linux server so that traffic that violates a compliance policy is blocked. Other possible remediations include reconfiguring or shutting down firewalls or routers or other network devices. Further, remediations may include dynamically blocking traffic sent to an IP address or network that violates a compliance policy.

In one embodiment, multiple instances can be created for each module, some of which may represent connection to a specific network device. For example, if the subnet has four routers that there may need to be remediations sent to, four instances should be configured of that module. When creating an instance, configuration information is specified for allowing the network discovery system to establish a connection with the network device. Then, for a configured instance, remediations may be added that describe the action or actions that are desired for the network device to perform when a policy is violated. In one embodiment, when the system executes remediations, it logs events to memory. Associated with the events include information about the remediation name, and the policy and rule that triggered it. In an embodiment, the user may view the remediation status through a conventional user interface.

Policy Violation Event(s) may also lead to system alerts. Alerts may be delivered by any mechanism including email, syslog, SNMP trap alerts, SMS messages, text messaging, IM, voicemail, amongst other means. An active alert may be launched if, for example, it is assigned to a Policy Violation Event (PVE) that is generated according to the embodiments of the present invention.

In accordance with an embodiment of the present invention, instructions adapted to be executed by a processor to perform a method are stored on a computer readable medium. The computer-readable medium can be a device that stores digital information. For example, a computer-readable medium includes a read-only memory (e.g., a Compact Disc-ROM ("CD-ROM") as is known in the art for storing software. Alternatively, the computer readable medium may be read access memory (RAM), EPROM, EEPROM, FLASHROM, DVD, CD or any other type of computer memory. The computer-readable medium can be accessed by a processor suitable for executing instructions adapted to be executed.

Embodiments of the present invention relate to data communications on one or more networks. The data communications can be carried by one or more communications channels of the one or more networks. A network can include wired communication links (e.g., coaxial cable, copper wires, optical fibers, a combination thereof, and so on), wireless communication links (e.g., satellite communication links, terrestrial wireless communication links, satellite-to-terrestrial communication links, a combination thereof, and so on), or a combination thereof. A communications link can include one or more communications channels, where a communications channel carries communications.

A system and method in accordance with an embodiment of the present invention disclosed herein can advantageously improve existing intrusion detection systems or real-time network reporting mechanisms by giving them contextual information about a computer network. Such a system and method is particularly advantageous in comparison to manual methods in that its information is updated automatically. The ability of the present invention to reduce false positives in the policy component is an important advantage over conventional network detection systems.

In the foregoing detailed description, systems and methods in accordance with embodiments of the present invention have been described with reference to specific exemplary embodiments. Accordingly, the present specification and figures are to be regarded as illustrative rather than restrictive. The scope of the invention is to be further understood by the claims, and by their equivalents.

What is claimed is:

1. A method for automatically and passively determining the characteristics of a network, comprising:
    storing policy configuration information in a policy component, wherein the policy configuration information comprises one or more rules associating authorized usage of a device with an associated device address;
    passively detecting an intrusion event instead of using active scanning, wherein the intrusion event comprises information including the associated device address;
    storing a network map in memory, wherein the network map contains operating system, service, and network topology characteristics detected using passive detection instead of active scanning;

linking the intrusion event information to the network map characteristics by way of the associated device address;

correlating the intrusion event information with device characteristics in the network map in order to determine one or more of the rules in the policy component for a device corresponding to the associated device address in the network map; and generating a policy violation event when the passively detected intrusion event is detected and is not authorized by the policy component for the device corresponding to the associated device address in the network map, without generating the policy violation event when a same passively detected intrusion event is detected and is authorized by the policy component for the device.

2. The method of claim 1, wherein the device address is an Internet protocol address.

3. The method of claim 1, wherein the device address is a MAC address.

4. The method of claim 1, further comprising initiating a remediation, when a policy violation event is generated.

5. The method of claim 1, further comprising initiating an alert, when a policy violation event is generated.

6. The method of claim 1, further comprising determining that the intrusion event is not a policy violation event.

7. The method of claim 1, wherein one or more packets transmitted on the network are used to identify the intrusion event.

8. The method of claim 1, the passively detected intrusion event being a service that the network map shows is newly used at the associated device address but is not permitted at the associated device address.

9. The method of claim 1, the passively detected intrusion event being a passively detected operating system that does not match an allowable operating system for the associated device address.

10. The method of claim 1, further comprising qualifying a criticality of the passively detected intrusion event based on a relationship of an operating system differently detected at the associated device address to the passively detected intrusion event.

11. A system for automatically and passively determining the characteristics of a network, comprising:

a network map storage device, wherein the network map storage device contains device addresses, operating system, service and network topology information detected using passive detection instead of active scanning;

a policy component, operably in communications with the network map storage device, wherein the policy component receives an intrusion event detected using the passive detection instead of active scanning, and enforces one or more network configuration rules associating authorized usage of a device with a device address, wherein the policy component accesses the operating system, the service, and the network topology information in the network map storage device using the device address associated with the intrusion event to determine whether information associated with the intrusion event matches network map information as part of evaluating one or more rules; and a response component, that generates a policy violation event when the passively detected intrusion event is detected and is not authorized by the policy component for a device corresponding to the associated device address in the network map, without generating the policy violation event when a same passively detected intrusion event is detected and is authorized by the policy component for the device.

12. The system of claim 11, further comprising an intrusion detection device, wherein the intrusion detection device detects the intrusion event.

13. The system of claim 11, wherein the device address is an Internet protocol address.

14. The system of claim 11, wherein the device address is a MAC address.

15. The system of claim 11, wherein an alert is generated by the response component, when the policy violation event is generated.

16. The system of claim 11, the passively detected intrusion event being a service that the network map shows is newly used at the associated device address but is not permitted at the associated device address.

17. The system of claim 11, the passively detected intrusion event being a passively detected operating system that does not match an allowable operating system for the associated device address.

18. The system of claim 11, further comprising a qualification component that qualifies a criticality of the passively detected intrusion event differently based on a relationship of an operating system detected at the associated device address to the passively detected intrusion event.

19. A system for automatically and passively determining the characteristics of a network, comprising:

a means for storing a network map, wherein the network map storage device contains device addresses, operating system, service, and network topology information detected using passive detection instead of active scanning;

a means for storing a policy component, operably in communications with the network map storing means, wherein the policy component storing means receives an intrusion event detected using the passive detection instead of active scanning, and enforces one or more network configuration rules associating authorized usage of a device with a device address;

wherein the policy component storing means accesses information in the network map storing means using the device address associated with the intrusion event to determine whether information associated with the intrusion event matches the operating system, the service, and the network topology information as part of evaluating one or more rules;

a response component that generates a policy violation event when the passively detected intrusion event is detected and is not authorized by the policy component for the operating system, the service, and the network topology information in the network map for the device corresponding to the associated device address in the network map, without generating the policy violation event when a same passively detected intrusion event is detected and is authorized by the policy component for the device.

20. The system of claim 19, further comprising an intrusion detection device, wherein the intrusion detection device detects the intrusion event.

21. The system of claim 19, wherein the device address is an Internet protocol address.

22. The system of claim 19, wherein the device address is a MAC address.

23. The system of claim 19, wherein an alert is generated by the response component, when the policy violation event is generated.

24. The system of claim 19, the passively detected intrusion event being a service that the network map shows is newly used at the associated device address but is not permitted at the associated device address.

25. The system of claim 19, the passively detected intrusion event being a passively detected operating system that does not match an allowable operating system for the associated device address.

26. The system of claim 19, further comprising a qualification component that qualifies a criticality of the passively detected intrusion event differently based on a relationship of an operating system detected at the associated device address to the passively detected intrusion event.

* * * * *